(12) United States Patent
Nunn, Jr. et al.

(10) Patent No.: US 6,739,553 B2
(45) Date of Patent: May 25, 2004

(54) K-SPAR CONFIGURATION FOR BONDED WING CONSTRUCTION

(75) Inventors: Kenneth E. Nunn, Jr., Colleyville, TX (US); Josef A. Fila, Euless, TX (US)

(73) Assignee: Bell Helicopter Textrom, Inc., Fort Worth, TX (US)

( * ) Notice: Subject to any disclaimer, the term of this patent is extended or adjusted under 35 U.S.C. 154(b) by 0 days.

(21) Appl. No.: 10/221,642

(22) PCT Filed: Apr. 5, 2001

(86) PCT No.: PCT/US01/10991
§ 371 (c)(1),
(2), (4) Date: Feb. 27, 2003

(87) PCT Pub. No.: WO01/76939
PCT Pub. Date: Oct. 18, 2001

(65) Prior Publication Data
US 2004/0035981 A1 Feb. 26, 2004

Related U.S. Application Data
(60) Provisional application No. 60/194,610, filed on Apr. 5, 2000.

(51) Int. Cl.⁷ ................................................ B64C 5/00
(52) U.S. Cl. .................... 244/123; 244/124; 244/117 R
(58) Field of Search ............................... 244/123, 124, 244/117 R

(56) References Cited

U.S. PATENT DOCUMENTS

| 1,822,940 | A | * | 9/1931 | Sundstedt | 244/123 |
| 1,866,961 | A | * | 7/1932 | Bellanca | 244/123 |
| 1,880,478 | A | * | 10/1932 | Ragsdale | 244/123 |
| 1,900,067 | A | * | 3/1933 | Messerschmitt | 244/123 |
| 1,908,757 | A | * | 5/1933 | Hathorn | 244/123 |
| 1,919,088 | A | * | 7/1933 | Breguet | 244/123 |
| 1,956,823 | A | * | 5/1934 | Carns | 244/123 |
| 1,976,480 | A | * | 10/1934 | Carleton et al. | 244/124 |
| 1,988,079 | A | * | 1/1935 | Henrichsen | 244/123 |
| 2,693,922 | A | | 11/1954 | Ellison et al. | 244/123 |
| 4,095,322 | A | * | 6/1978 | Scarpati et al. | |
| 4,565,595 | A | | 1/1986 | Whitener | 156/156 |
| 5,534,354 | A | | 7/1996 | Gregg et al. | 428/593 |
| 5,735,486 | A | | 4/1998 | Piening et al. | 244/124 |
| 5,848,765 | A | | 12/1998 | Gillespie | 244/124 |
| 6,467,730 | B2 | * | 10/2002 | Laugt | 244/123 |

FOREIGN PATENT DOCUMENTS

DE 361286 * 4/1990 ................ 244/123

* cited by examiner

Primary Examiner—Michael J. Carone
Assistant Examiner—L. Semunegus
(74) Attorney, Agent, or Firm—James E. Walton

(57) ABSTRACT

A method and apparatus of bonded wing construction in which skins (35, 39) having shaped protrusions (37, 41) are bonded to rib members having correspondingly shaped intrusions (33). The skins may also include differently shaped protrusions (53, 55) which are bonded to K-shaped spars (51) having correspondingly shaped intrusions (61, 63).

9 Claims, 5 Drawing Sheets

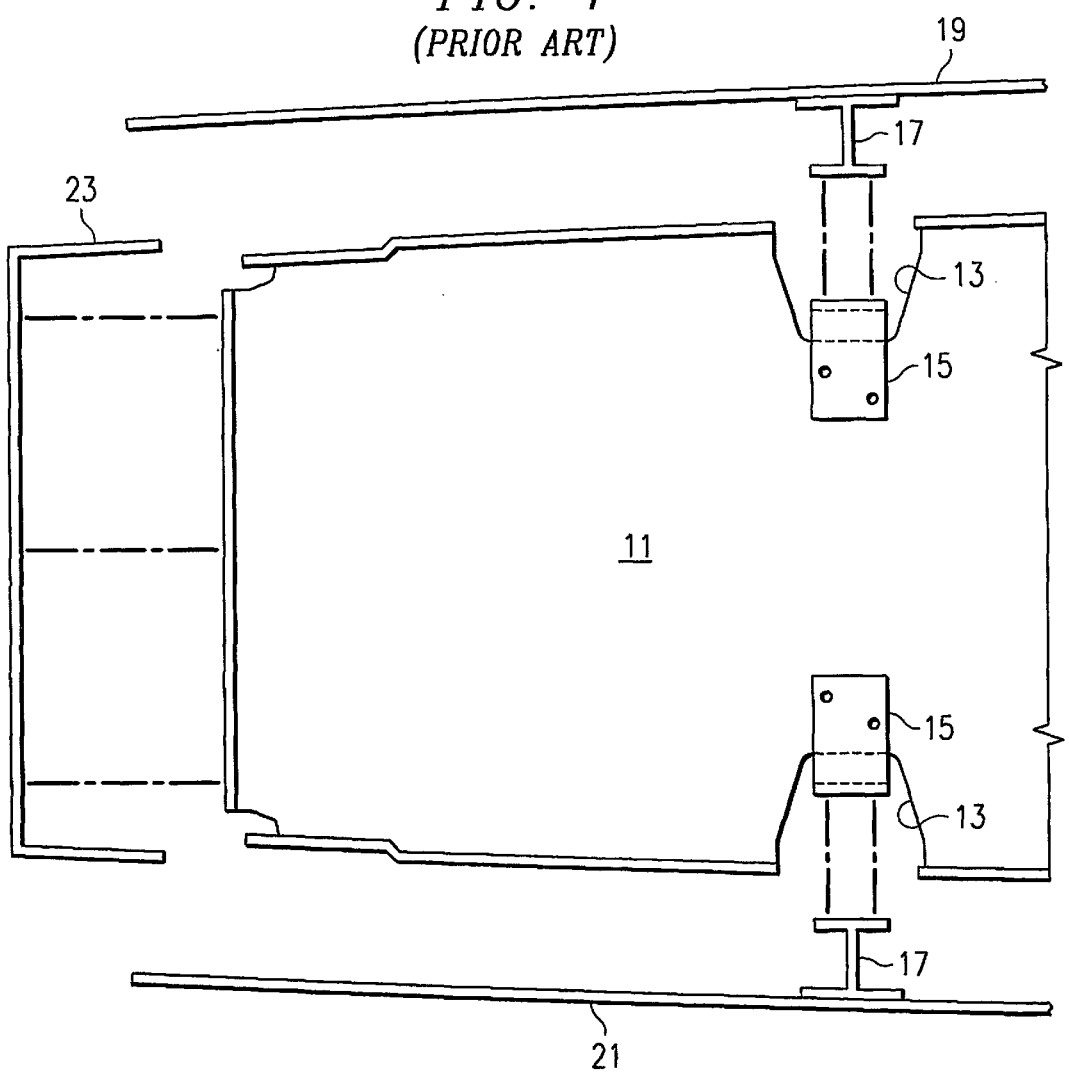

K-SPAR CONFIGURATION FOR BONDED WING CONSTRUCTION

This application claims the benefit of provisional application No. 60/194,610 filed Apr. 5, 2000.

TECHNICAL FIELD

The present invention relates to aircraft wing construction. In particular, the present invention relates to a method and apparatus for a bonded wing construction.

DESCRIPTION OF THE PRIOR ART

Traditionally, aircraft wing structures were constructed by fastening C-shaped channel spars to the ends of ribs and by mechanically fastening I-beam-stiffened skins to angle clips disposed in channels in the wing ribs. These systems rely purely on mechanical assembly for spar to skin and skin to rib interfaces.

SUMMARY OF THE INVENTION

There is a need for a bonded wing construction which does not rely purely upon mechanical assembly to establish the necessary spar to skin and rib to skin interfaces without compromising the stiffness of the wing.

Therefore, it is an object of the present invention to provide a method and apparatus for bonded wing construction that does not rely purely upon mechanical assembly to effectuate the skin to rib interface and the spar to rib interface, and which does not sacrifice wing stiffness.

The above objects are achieved by providing a method and apparatus of bonded wing construction in which skins having generally rhombus shaped protrusions are bonded to rib members having correspondingly shaped intrusions. The skins may also include triangular shaped protrusions which are bonded to K-shaped spars having correspondingly shaped intrusions.

The present invention has significant advantages, including: (1) only about 5% mechanical assembly; (2) less complex assembly; (3) a reduction in part counts, detail fabrication, assembly fastener installation, and associated assembly recurring costs; (4) a reduction in the complexity of assembly tool design and non-recurring tool procurement costs; and (5) reduction in skin manufacturing costs and cycle time.

The above objects and advantages, as well as others, will be evident from the following detailed description of the present invention.

BRIEF DESCRIPTION OF THE DRAWINGS

FIG. 1 is an assembly view of a prior-art wing structure.

DESCRIPTION OF THE PREFERRED EMBODIMENT

Figure 2A:
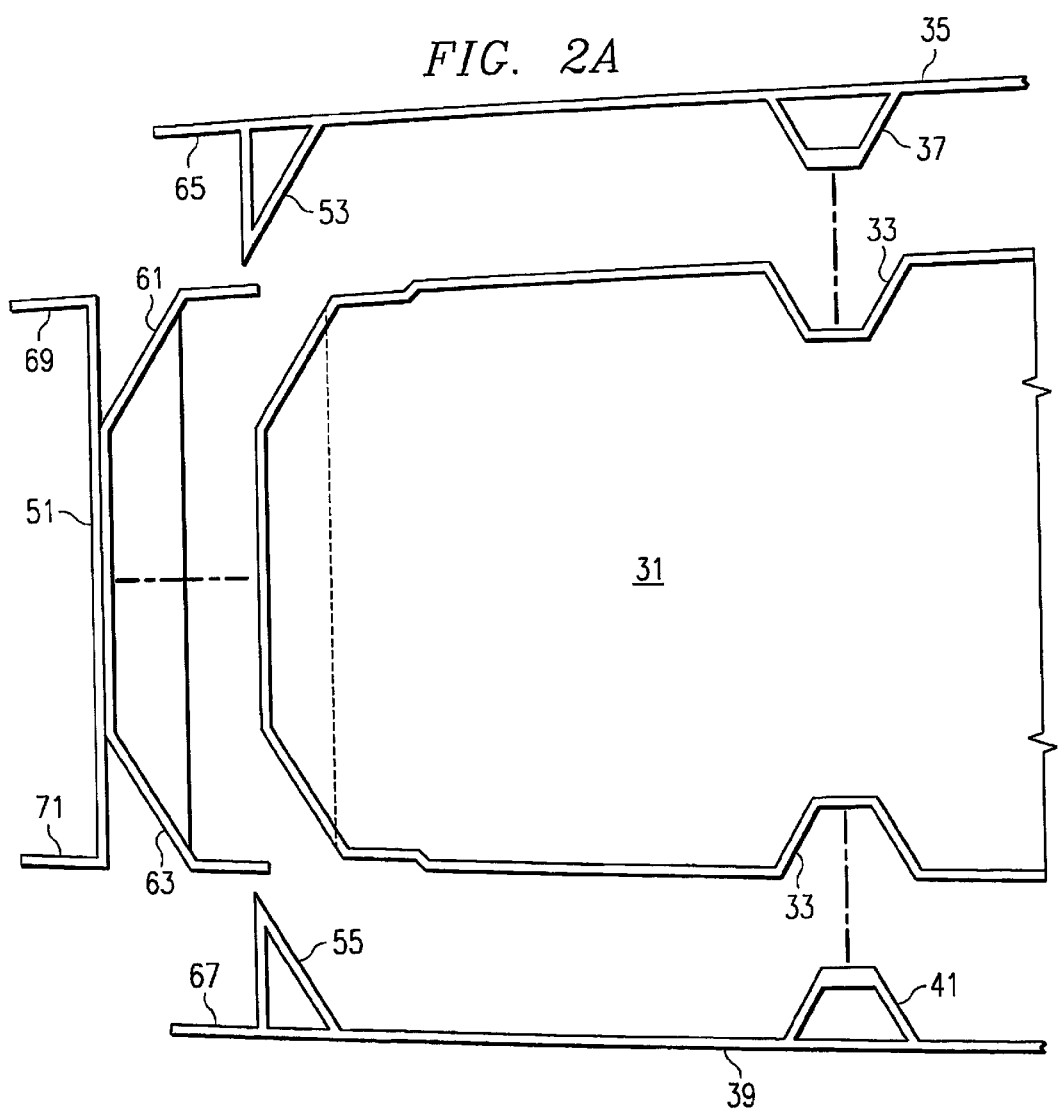
FIGS. 2A and 2B are assembly views of the K-spar bonded structure configuration of the present invention.

Referring to FIG. 1 in the drawings, a prior-art wing construction is illustrated. A rib 11 includes channels 13 into which are mechanically installed angle clips 15. Angle clips 15 are mechanically coupled to I-beams 17 carried by an upper stiffened skin 19 and a lower stiffened skin 21. A C-shaped spar 23 is coupled to rib 11 and/or upper and lower skins 19 and 21. This is a typical mechanical assembly which requires a relatively large number of parts and which requires a complex assembly process.

Figure 2B:
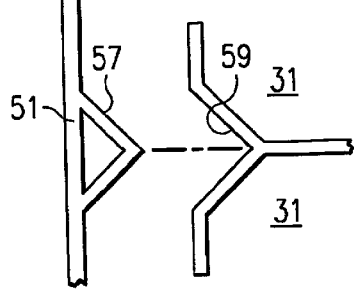

Referring now to FIGS. 2A and 2B in the drawings, the K-spar bonded structure configuration of the present invention is illustrated. A rib 31 includes a plurality of generally rhombus shaped intrusions 33. An upper stiffened skin 35 includes a plurality (only one shown) of generally correspondingly rhombus shaped protrusions 37 that are aligned with rib intrusions 33 on the upper surface of rib 31. In a similar fashion, a lower stiffened skin 39 includes a plurality (only one shown) of generally correspondingly rhombus shaped protrusions 41 that are aligned with rib intrusions 33 on the lower surface of rib 31. It should be understood that the geometric shape of the protrusions can vary widely from application to application.

A K-shaped spar, or K-spar, 51 is configured to conform to the end of rib 31. As best seen in FIG. 2B, K-spar 51 is also wedge shaped in the vertical direction, having a protruding ridge 57 which mates with an intruding channel 59 in one or more ribs 31. Upper skin 35 includes a triangular protrusion 53. Likewise, lower skin 39 includes a triangular shaped protrusion 55. K-spar 51 includes an upper triangular intrusion 61 and a lower triangular intrusion 63. It should be understood that upper and lower triangular intrusions 61 and 63 may be of other shapes.

Skin 35 includes a tab portion 65, and skin 39 includes a tab portion 67. K-spar 51 includes corresponding upper and lower tab portions 69 and 71.

When assembled and bonded together using conventional techniques and bonding materials, protrusions 37 on upper skin 35 and protrusions 41 on lower skin 39 interlockingly mate with intrusions 33 in rib 31; protrusions 53 on upper skin 35 and protrusions 55 on lower skin 39 interlockingly mate with upper intrusions 61 and lower intrusions 63, respectively on K-spar 51; and tab portions 65 and 67 mate with tab portions 69 and 71, respectively. Also, protruding ridges 57 interlockingly mate with channels 61. This configuration provides large surface areas for which to bond these component parts together and create a stiff structure. This can be done with only about 5% mechanical assembly, as opposed to the 100% mechanical assembly associated with the prior art.

Figure 3:
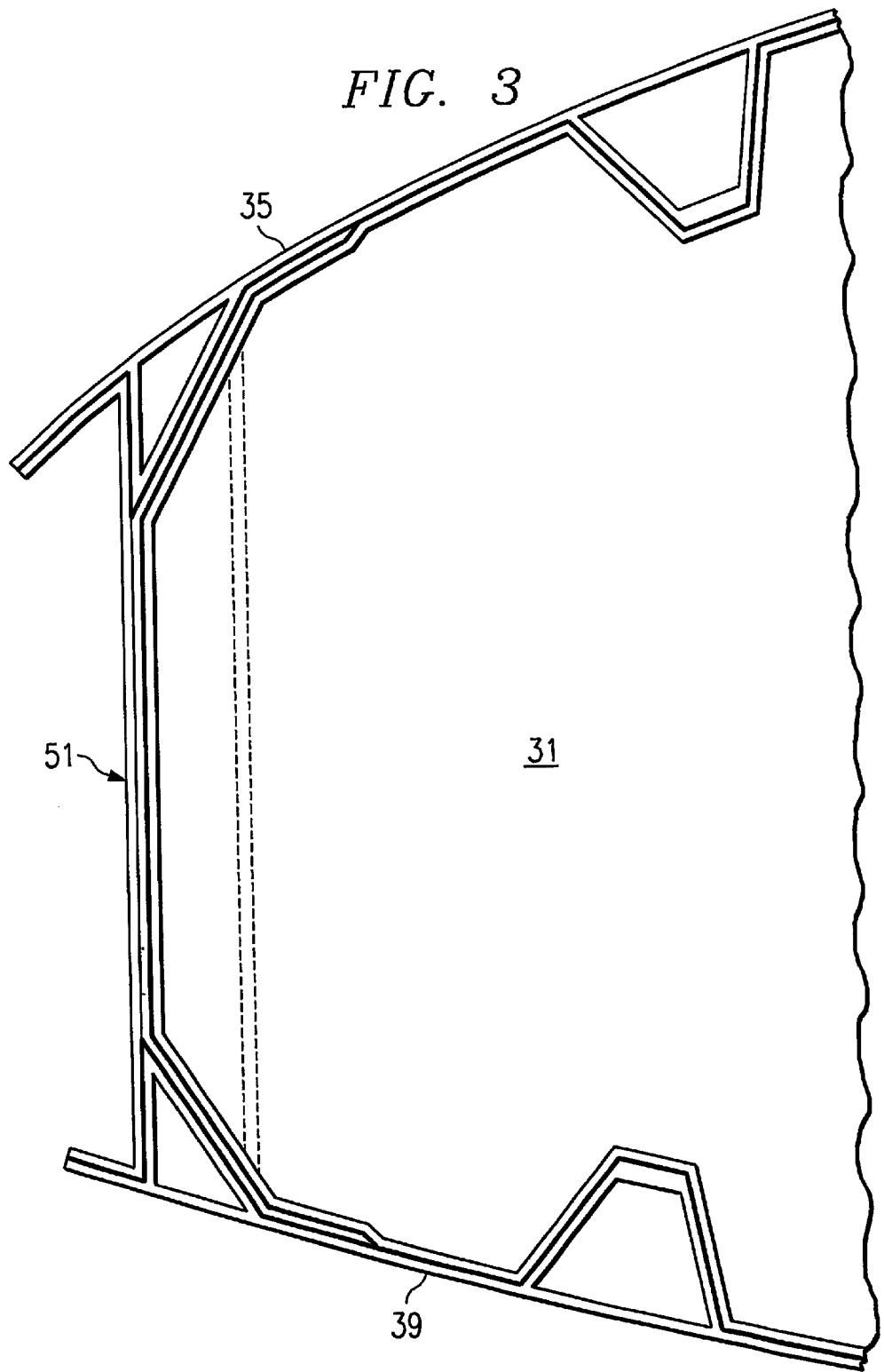
FIG. 3 illustrates the bond socket concept of the present invention.

Referring now to FIG. 3 in the drawings, the assembled and bonded structure is illustrated. The bonding pattern is shown in bold.

Figure 4:
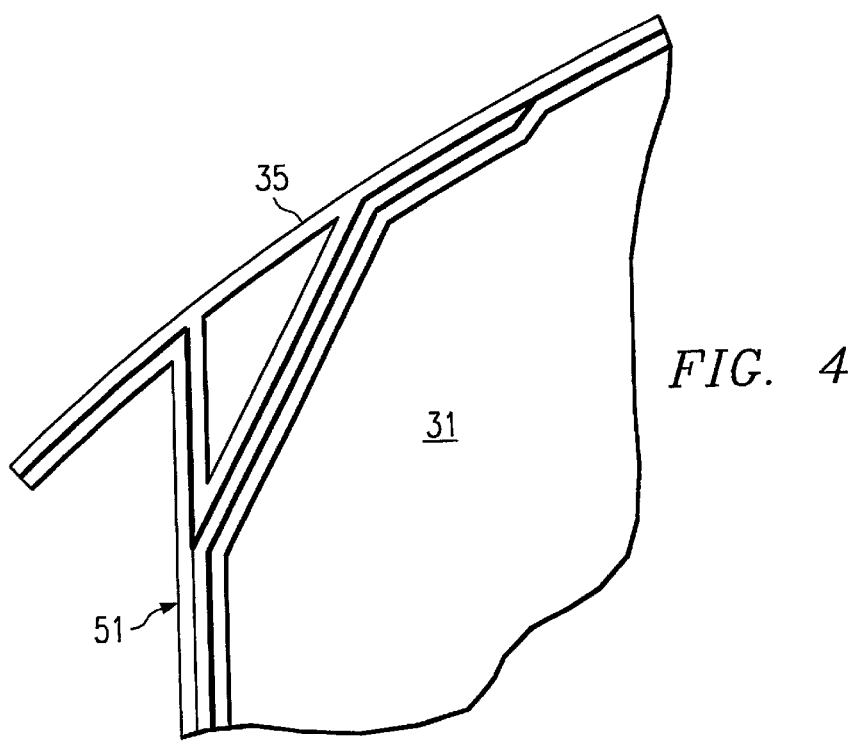
FIG. 4 is an enlarged view of the bond socket concept of FIG. 3 for a forward spar.

Referring now to FIG. 4 in the drawings, an enlarged view of a forward K-spar and the bond socket concept according to the present invention is illustrated. The bonding pattern is shown in bold.

Figure 5:
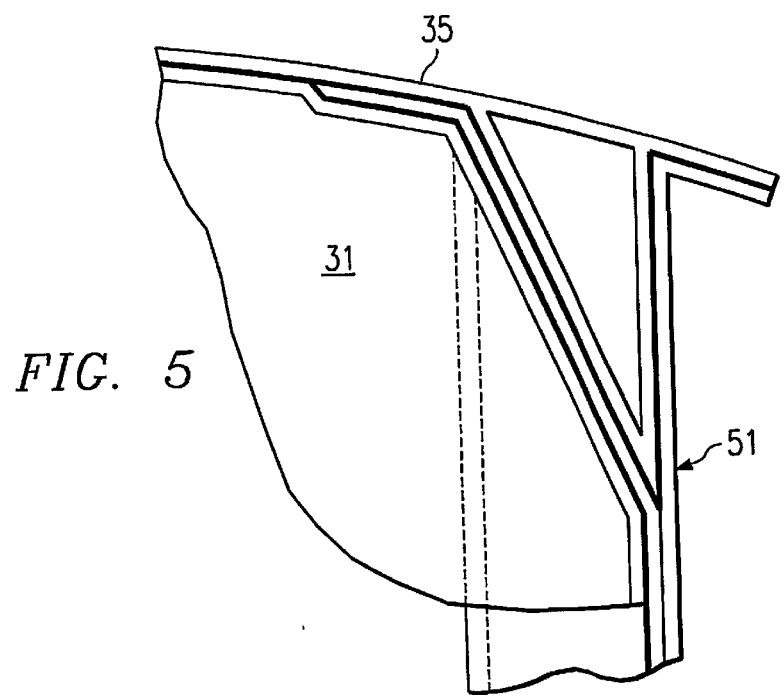
FIG. 5 is an enlarged view of the bond socket concept of FIG. 3 for an aft spar.

Referring now to FIG. 5 in the drawings, an enlarged view of a forward K-spar and the bond socket concept according to the present invention is illustrated. The bonding pattern is shown in bold.

It should be understood that the method of the present invention can be used to configure a wide variety of structures, not just aircraft wings.

Figure 6:
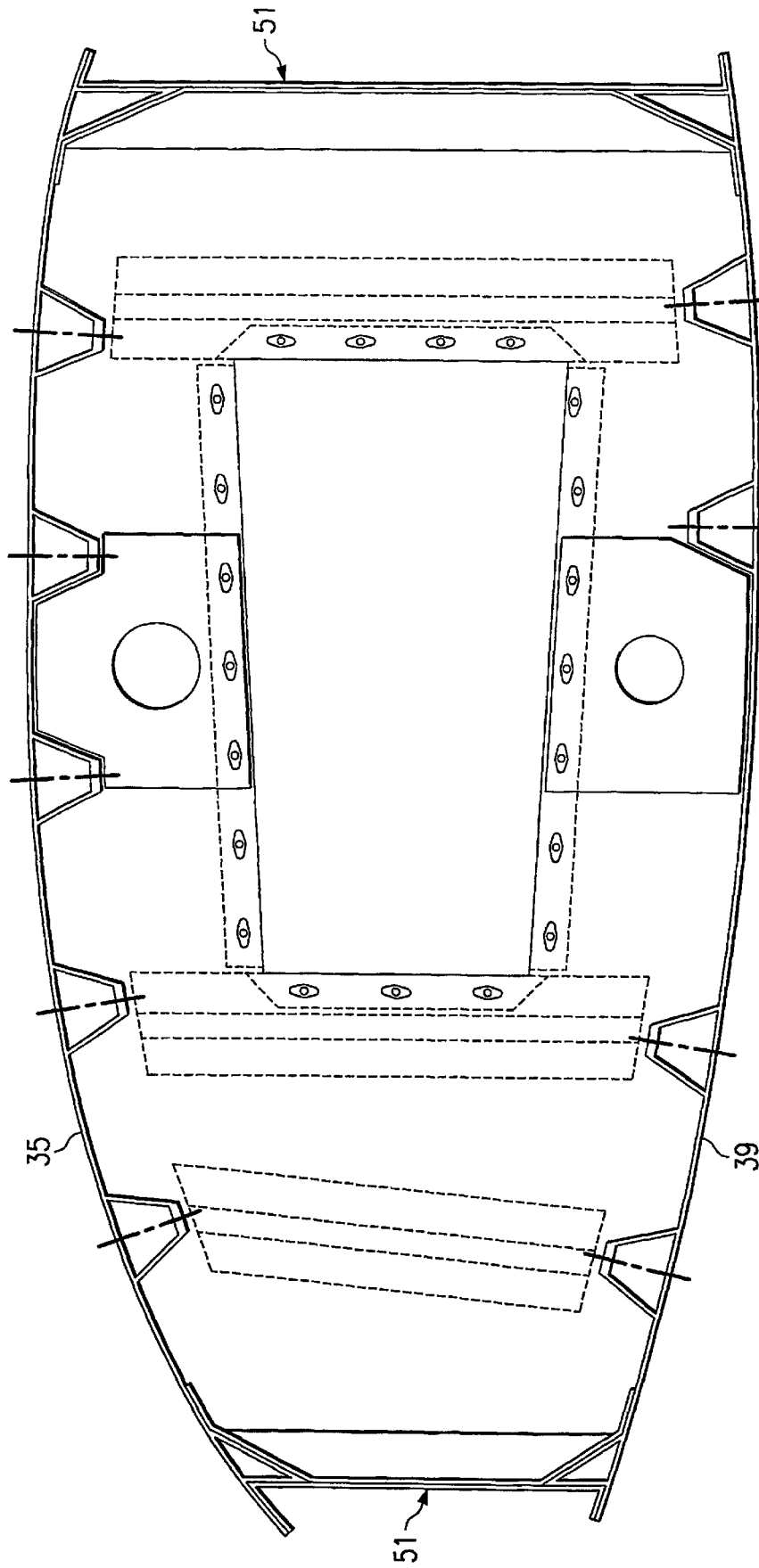
FIG. 6 is an assembly view of the K-spar bonded structure configuration of the present invention used in a torque box application.

Referring now to FIG. 6 in. the drawings, the present invention is illustrated in a torque box application.

The present invention has significant advantages, including: (1) only about 5% mechanical assembly; (2) less complex assembly; (3) a reduction in part counts, detail fabrication, assembly fastener installation, and associated assembly recurring costs; (4) a reduction in the complexity of assembly tool design and non-recurring tool procurement costs; and (5) reduction in skin manufacturing costs and cycle time.

Although the present invention is shown in a limited number of forms, it is not limited to just these forms, but is amenable to various changes and, modifications without departing from the spirit thereof.

What is claimed is:

1. A structure for an aircraft, comprising:
    a rib spar having first and second opposed surfaces, and at least one end surface connecting the first and second opposed surfaces, wherein the first and second opposed surfaces each have at least one intrusion therein;
    a K-spar bonded to the rib spar end surface, the K-spar having first and second intrusions respectively adjacent the first and second rib spar opposed surfaces;
    a first skin member bonded to the first rib spar surface, wherein the first skin member has a first protrusion near an end thereof adapted to fit into the K-spar first intrusion, and at least one additional protrusion adapted to fit into the rib spar first surface intrusion; and
    a second skin member bonded to the second rib spar surface, wherein the second skin member has a first protrusion near an end thereof adapted to fit into the K-spar second intrusion, and at least one additional protrusion adapted to fit into the rib spar second surface intrusion.

2. The structure of claim 1, further comprising:
    at least one end intrusion in the rib spar end surface; and
    corresponding at least one protrusion on the K-spar, wherein the K-spar protrusion is adapted to fit into the rib spar end surface intrusion.

3. The structure of claim 2, wherein the rib spar end surface intrusion has a triangular cross-section, and the K-spar protrusion has a matching triangular cross-section.

4. The structure of claim 1, wherein the K-spar first and second intrusions each have a triangular cross-section, and wherein the first and second skin member first protrusions each have a triangular cross-section that matches the K-spar first and second intrusions, respectively.

5. The structure of claim 1, wherein the rib spar first and second opposed surface intrusions have a rhombus-shaped cross-section, and the first and second skin member protrusions each have a rhombus-shaped cross-section that matches the rib spar first and second opposed surface intrusions.

6. The structure of claim 1, wherein the rib spar has a second end surface opposite the end surface, and further comprising:
    a second K-spar bonded to the rib spar second end surface, the second K-spar having first and second intrusions respectively adjacent the first and second rib spar opposed surfaces;
    wherein the first and second skin members additionally have second protrusions near respective second ends thereof, such second intrusions adapted to fit into the second K-spar first and second intrusions, respectively.

7. The structure of claim 1, wherein the K-spar includes at least one protrusion extending away from the rib spar end surface, and approximately coplanar with the rib spar first surface, and wherein the first skin member includes a projecting portion at the end that is bonded to the K-spar protrusion.

8. A method for assembling a structure for an aircraft, comprising the steps of:
    providing a rib spar having first and second opposing surfaces and at least one end surface, the first and second opposing surfaces each having at least one intrusion therein;
    bonding a K-spar to the rib spar end surface, wherein the K-spar has first and second intrusions therein adjacent the rib spar first and second surfaces; and
    bonding first and second skin members to the first and second rib spar surfaces, respectively, wherein the first and second skin members each have protrusions corresponding to, and adapted to mate with, the rib spar surface intrusions and the K-spar first and second intrusions, respectively.

9. The method of claim 8, wherein the bonding steps comprise bonding the spars and members together with a bonding material.

* * * * *